United States Patent
Nakagawa et al.

(10) Patent No.: US 7,001,858 B2
(45) Date of Patent: Feb. 21, 2006

(54) GLASS FIBER AND THERMOPLASTIC RESIN COMPOSITION

(75) Inventors: Hideki Nakagawa, Tokyo (JP); Yoshiro Niino, Tokyo (JP); Yoshinao Kobayashi, Tokyo (JP)

(73) Assignees: Asahi Glass Company, Limited, Tokyo (JP); Asahi Fiber Glass Company, Limited, Tokyo (JP)

( * ) Notice: Subject to any disclaimer, the term of this patent is extended or adjusted under 35 U.S.C. 154(b) by 405 days.

(21) Appl. No.: 10/364,392

(22) Filed: Feb. 12, 2003

(65) Prior Publication Data

US 2003/0153449 A1 Aug. 14, 2003

(30) Foreign Application Priority Data

Feb. 13, 2002 (JP) .............................. 2002-035440

(51) Int. Cl.
*C03C 13/00* (2006.01)
*C03C 3/16* (2006.01)

(52) U.S. Cl. ........................... 501/35; 501/46; 501/47; 501/48; 524/414

(58) Field of Classification Search ................. 501/35, 501/36, 46, 47, 48; 524/414
See application file for complete search history.

(56) References Cited

U.S. PATENT DOCUMENTS

| | | | |
|---|---|---|---|
| 3,732,181 A | 5/1973 | Ray et al. | |
| 3,933,689 A | 1/1976 | Ray et al. | |
| 4,940,677 A | 7/1990 | Beall et al. | |
| 5,122,484 A | 6/1992 | Beall et al. | |
| 5,328,874 A * | 7/1994 | Beall et al. | .................... 501/45 |
| 5,330,940 A | 7/1994 | Aitken et al. | |
| 5,767,174 A * | 6/1998 | Nakagawa et al. | .......... 523/217 |
| 6,762,219 B1 * | 7/2004 | Greiner et al. | .............. 523/223 |
| 6,790,882 B1 * | 9/2004 | Greiner et al. | .............. 523/223 |
| 2003/0105200 A1 * | 6/2003 | Greiner et al. | .............. 524/414 |

FOREIGN PATENT DOCUMENTS

| | | |
|---|---|---|
| EP | 0 578 023 | 1/1994 |
| JP | 46-5091 | 11/1971 |
| JP | 49-57074 | 6/1974 |
| JP | 6-56472 | 3/1994 |
| JP | 8-183632 | 7/1996 |
| JP | 9-3335 | 1/1997 |
| JP | 10-101364 * | 4/1998 |
| JP | 2001-64036 | 3/2001 |
| JP | 2001-64524 | 3/2001 |

OTHER PUBLICATIONS

English Abstract for JP 10-036610, Feb. 10, 1998.

* cited by examiner

*Primary Examiner*—Karl Group
(74) *Attorney, Agent, or Firm*—Oblon, Spivak, McClelland, Maier & Neustadt, P.C.

(57) ABSTRACT

Glass fiber which substantially has the following composition as represented by mol percentage and has a glass transition temperature higher than 300° C. and lower than 400° C.:

$Li_2O+Na_2O+K_2O$: 5 to 35%, $P_2O_5$: 20 to 27%, $SO_3$: 3 to 20%, ZnO: 10 to 55%, MgO: 0 to 20%, ZnO+MgO: 10 to 55%, $Al_2O_3$: 1 to 5%, and $B_2O_3$: 8 to 20%.

17 Claims, No Drawings

GLASS FIBER AND THERMOPLASTIC RESIN COMPOSITION

The present invention relates to glass fiber having a function to impart flame retardancy, and a thermoplastic resin composition containing it.

Heretofore, as a glass to be incorporated for the purpose of imparting flame retardancy to a resin or to suppress smoking at the time of combustion of a resin, JP-A-8-183632, JP-A-9-3335 or JP-A-10-101364 discloses glass comprising ZnO, $P_2O_5$ and $SO_3$ as main components. Further, for a similar purpose, JP-A-49-57074 discloses a fiber-reinforced composite material of a thermosetting resin containing glass which contains $P_2O_5$ as the main component and which has a glass transition temperature of at most 300° C., preferably at most 250° C.

The above publications mention that such glass may be in the form of a powder or fiber. However, the glass disclosed in each publication is one which, according to Examples, is practically used in the form of a powder obtained by pulverizing the glass by a mill. Such a glass powder is usually a mixture of fine and coarse particles having non-uniform particle sizes, even if it is classified by means of a sieve, and the shapes of individual particles are non-uniform. When a resin, particularly a thermoplastic resin, and glass are compounded to obtain a thermoplastic resin composition, or when such a thermoplastic resin composition is formed into a molded product by e.g. an injection molding method, if the glass is a powder having a non-uniform size or shape as mentioned above, it can hardly be uniformly dispersed in the resin, whereby it has a problem that it cannot provide adequate effects to impart flame retardancy to the resin or to suppress smoking.

Further, with respect to the glass disclosed in each publication, no specific consideration is given to a composition suitable for forming into fiber. Particularly, the glass disclosed in JP-A-49-57074 has a problem that since the glass transition temperature is as low as at most 300° C., a strict temperature control will be required at the time of forming into fiber, whereby it is difficult to constantly produce it by mass production by means of a large size fiber forming apparatus where a temperature distribution to some extent is unavoidable.

Further, if a glass powder having a low glass transition temperature i.e. a glass transition temperature of at most 300° C., is incorporated to a thermoplastic resin, followed by heating and kneading, the sizes or shapes of the individual particles of the glass powder tend to be more non-uniform by the heat and the external force during kneading, and consequently, the dispersed state of glass in the thermoplastic resin composition or in the molded product obtained by molding such a composition, tends to be more non-uniform.

On the other hand, as glass to be incorporated for the purpose of reinforcing a resin, JP-A-46-5091 discloses a composite material comprising a thermoplastic resin and glass which contains $P_2O_5$ and PbO as the main components and which has a glass transition temperature of from 100 to 400° C., and the glass transition temperature of glass specifically disclosed in Examples, is at most 300° C. Further, JP-A-6-56472 discloses a zinc phosphate type glass composition suitable for continuously producing glass fiber.

However, the glass disclosed in JP-A-46-5091 also has a low glass transition temperature and thus has the same two problems as mentioned above. The glass disclosed in JP-A-6-56472 is suitable for forming into fiber, but has a problem that the water resistance of the glass fiber thereby obtainable is low, since the $P_2O_5$ content is at least 28 mol %. Further, with the glass fiber disclosed in the same publication, no consideration is given for imparting flame retardancy to a resin, for suppressing smoking at the time of combustion of a resin or with respect to the color of the resin composition.

It is an object of the present invention to overcome the above drawbacks of the prior art and to provide glass fiber which can be constantly mass-produced and which can be uniformly dispersed in a thermoplastic resin, so that the effects to impart flame retardancy or to suppress smoking, can adequately be provided. Further, it is another object of the present invention to combine such glass fiber with a thermoplastic resin to provide a thermoplastic resin composition capable of presenting a molded product having flame retardancy.

Thus, the present invention provides glass fiber which substantially has the following composition as represented by mol percentage and has a glass transition temperature higher than 300° C. and lower than 400° C.:

$Li_2O+Na_2O+K_2O$: 5 to 35%, $P_2O_5$: 20 to 27%, $SO_3$: 3 to 20%, ZnO: 10 to 55%, MgO: 0 to 20%, ZnO+MgO: 10 to 55%, $Al_2O_3$: 1 to 5%, and $B_2O_3$: 8 to 20%.

Further, the present invention provides such glass fiber which further contains $MoO_3$ in an amount of from 0.05 to 1.5%, as represented by mol percentage.

Still further, the present invention provides a thermoplastic resin composition comprising 100 parts by mass of a thermoplastic resin and from 1 to 400 parts by mass of such glass fiber.

Now, the present invention will be described in detail with reference to the preferred embodiments.

The glass fiber of the present invention shows, as glass, a glass transition temperature higher than 300° C. and lower than 400° C. If the glass transition temperature is 300° C. or lower, a strict temperature control will be required at the time of forming into fiber, and if a temperature variation takes place in a large size fiber forming apparatus during mass production, breakage of filaments may be frequented, and it will be difficult to produce glass fiber constantly. On the other hand, if the glass transition temperature is 400° C. or higher, such fiber tends to be inferior in the effects to provide flame retardancy or to suppress smoking, since the temperature for the glass fiber to melt and flow by the heat at the time of combustion of the resin component of the thermoplastic resin composition, will be high. Further, it is preferred that the glass fiber shows a glass transition temperature which is higher than 340° C. and lower than 400° C.

The glass composition of the glass fiber of the present invention is one whereby constant mass production of fiber is possible, and it provides sufficient effects to impart flame retardancy or to suppress smoking at the time of combustion, to a resin composition or to a molded product obtainable from such a resin composition.

Among glass components, $Li_2O$, $Na_2O$ and $K_2O$ are such that the total of their contents is required to be from 5 to 35 mol %. Among $Li_2O$, $Na_2O$ and $K_2O$, only one of them, or two or more of them may be incorporated. Further, it is preferred that $Li_2O$ is from 2 to 20 mol %, $Na_2O$ is from 2 to 30 mol % and $K_2O$ is from 2 to 20 mol %.

$P_2O_5$ is a component to impart flame retardancy to the thermoplastic resin composition or to a molded product obtainable therefrom, and its content is required to be within a range of from 20 to 27 mol % to facilitate forming into fiber and to secure water resistance.

$SO_3$ is a component to suppress smoking at the time of combustion of the thermoplastic resin composition, particularly the composition of a thermoplastic resin containing chlorine, or a molded product obtained from such a composition, or to lower the glass transition temperature. Its content is required to be from 3 to 20 mol %. If it is less than 3 mol %, no adequate effects to suppress smoking can be obtained, and if it exceeds 20 mol %, the water resistance of glass tends to remarkably decrease, such being undesirable.

ZnO is a component to suppress smoking at the time of combustion of the thermoplastic resin composition, particularly the composition of a thermoplastic resin containing chlorine, or a molded product obtained from such a composition. Its content is required to be from 10 to 55 mol %. If it is less than 10 mol %, the effects to suppress smoking or the desired water resistance, cannot be obtained, and if it exceeds 55 mol %, devitrification of glass increases, such being undesirable for forming into fiber.

MgO is not an essential component, but may be incorporated up to 20 mol % to facilitate forming into fiber or to improve the water resistance.

The total amount of the above-mentioned ZnO and MgO is within a range of from 10 to 55 mol %, since MgO may be incorporated, as substituted for a part of ZnO.

The content of $Al_2O_3$ is required to be from 1 to 5 mol %. If it is less than 1 mol %, the water resistance tends to be low, and if it exceeds 5 mol %, melting of the glass material tends to be difficult, whereby homogeneous glass tends to be hardly obtainable.

The content of $B_2O_3$ is required to be from 8 to 20 mol %. If it is less than 8 mol %, the decrease in the viscosity of glass by an increase of the temperature, tends to be abrupt, whereby forming into fiber tends to be difficult, and if it exceeds 20 mol %, the glass transition temperature tends to increase, and the water resistance tends to be low, such being undesirable.

The content of $MoO_3$ is preferably from 0.05 to 1.5 mol %. If it is less than 0.05 mol %, the surface tension of glass tends to be small, whereby wetting at a bushing tip during drawing fiber(s), tends to be substantial, whereby continuous fiber forming tends to be difficult. If it exceeds 1.5 mol %, the color of glass tends to be yellowish, whereby there will be a problem of the appearance such that the color tone of a molded product formed from a thermoplastic resin composition obtained by kneading glass fiber made of this composition and a thermoplastic resin, tends to be yellowish. It is preferably from 0.05 to 1.0 mol % with a view to suppressing yellowing of the glass.

Further, within a range not to impair the effects of the present invention, oxides of elements other than the above, such as Ca, Sr, Ba, Ti, Fe, Co, Ni, Cu, Zr and Sn, may be incorporated as glass components.

The above-described glass composition in the present invention can be formed into fiber constantly by mass production in the following form of glass fiber.

With respect to the form of the glass fiber of the present invention, it can be used in the form of short fiber or long fiber. The long fiber includes a form such as a chopped strand or roving. Usually, a glass fiber strand is one having at least two, e.g. from a few tens to a few thousands, glass monofilaments bundled. A chopped strand is one having such a strand cut in a prescribed length, and a roving is one having glass monofilaments or such strands drawn and bundled to have a prescribed count of yarn. Further, the length of the above chopped strand is preferably from 1 to 20 mm.

The glass fiber of the present invention can be produced by means of a known method and apparatus. Glass fiber of a long fiber type is one which is obtained in the same manner as E glass fiber to be commonly used as a reinforcing fiber for e.g. resins, in such a manner that firstly, glass monofilaments drawn by a fiber forming apparatus so-called a bushing are bundled, while applying a sizing agent, to obtain a strand and then winding up this strand, or cutting it directly in a prescribed length.

The average diameter of monofilaments in the glass fiber of the present invention, is preferably from 1 to 30 μm, and if it is less than 1 μm, the productivity of the fiber tends to deteriorate, and if it exceeds 30 μm, the dispersibility is likely to be poor when the fiber is kneaded with a thermoplastic resin. More preferably, the average diameter is from 6 to 23 μm.

It is preferred to apply a sizing agent to the glass fiber of the present invention, whereby when the glass fiber is kneaded with a thermoplastic resin to form a thermoplastic resin composition or when such a thermoplastic resin composition is molded, the glass fiber may be protected from e.g. the external force, the adhesion between the glass fiber and the thermoplastic resin can be improved, and fuzzing or generation of static electricity can be suppressed during the use of the glass fiber, whereby the handling efficiency will be improved. Particularly, if the adhesion between the glass fiber of the present invention and a thermoplastic resin is inadequate, a void space will be formed at their interface, and this void space hinders melting of the glass at the time of combustion to form a glass coating film, whereby the effects to impart flame retardancy tend to be inadequate, and it is important to prevent such drawbacks.

As such a sizing agent, a sizing agent composed of such components as a coupling agent, a film former, a lubricant and an antistatic agent, which is commonly used for common E glass fiber as a resin-reinforcing fiber, can be used. Also in the present invention, such components contained in the sizing agent may suitably be selected depending upon the type of the thermoplastic resin to be blended. The amount of the sizing agent to be applied to the glass fiber is preferably from 0.1 to 5.0 mass % as the solid content based on the mass of the glass fiber after the application. If the applied amount is less than 0.1 mass %, it tends to be difficult to sufficiently improve the above-mentioned handling efficiency and the adhesion, or to protect the glass fiber. On the other hand, if the applied amount exceeds 5.0 mass %, the sizing agent tends to hinder the dispersion of the glass fiber in the thermoplastic resin. Further, in a case where the glass fiber is used in the form of a continuous glass fiber and impregnated with a thermoplastic resin, the amount of the sizing agent to be applied, is preferably from 0.1 to 3.0 mass %. If the applied amount exceeds 3.0 mass %, the sizing agent tends to hinder impregnation of the thermoplastic resin into the glass fiber.

As the coupling agent among the components constituting the above sizing agent, a silane type coupling agent, a borane type coupling agent or a titanate type coupling agent may, for example, be used. The silane type coupling agent may, for example, be an amino silane type coupling agent, an epoxy silane type coupling agent or an acryl silane type coupling agent. As the film former, a polymer such as a vinyl acetate resin, a urethane resin, an acrylic resin, a polyester resin, a polyether resin, a phenoxy resin, a polyamide resin, an epoxy resin or a polyolefin resin, or a modified product thereof, may be employed. As the lubricant, a surfactant of an aliphatic ester type, an aliphatic ether type, an aromatic ester type or an aromatic ether type may be employed. As the antistatic agent, an inorganic salt such as lithium chloride or potassium iodide, or a quaternary ammonium salt of e.g. an ammonium chloride type or an ammonium ethosulfate type, may be employed.

The thermoplastic resin composition of the present invention is a thermoplastic resin composition having from 1 to 400 parts by mass of the glass fiber of the present invention blended to 100 parts by mass of a thermoplastic resin. If the amount of the glass fiber is less than 1 part by mass, no adequate effects to impart flame retardancy to the thermoplastic resin composition or a molded product obtainable from such resin composition, or to suppress smoking at the time of combustion, tend to be obtained, and if the amount exceeds 400 parts by mass, it tends to be difficult to uniformly disperse the glass fiber in a thermoplastic resin.

The thermoplastic resin to be used in the present invention is not particularly limited and may, for example, be polyethylene, polypropylene, polyamide, polyethylene terephthalate, polybuthylene terephthalate, polystyrene, syndiotactic polystyrene, a styrene/acrylonitrile copolymer, an acrylonitrile/butadiene/styrene copolymer, a polyacetal, a polyimide, a polyether imide, a polycarbonate, a polyphenylene sulfide, a thermoplastic polyurethane resin, a fluorocarbon resin, polyvinyl chloride, chlorinated vinyl chloride, chlorinated polyethylene, polyepichlorohydrin or polyvinylidene chloride. Particularly, the glass fiber of the present invention is capable of imparting a function to suppress smoking during combustion, to a thermoplastic resin containing chlorine.

In the present invention, resins as described above may be used alone, or a mixture of two or more of them or a copolymer having two or more of them preliminarily copolymerized, may be employed. To the thermoplastic resin composition of the present invention, known additives such as a coloring agent, a resin-modifier, a stabilizer, an antidripping agent and a filler other than the glass fiber, may be incorporated in addition to the thermoplastic resin and the glass fiber of the present invention, depending upon the particular application or the molding conditions. Such additives may be used as mixed with the thermoplastic resin in accordance with a common method. Particularly in a case where the thermoplastic resin is a polycarbonate resin, the flame retardancy of the resulting resin composition can be further improved by incorporating a flame retardant of an organic phosphorus type and the glass fiber of the present invention.

The glass fiber of the present invention by itself has an effect to reinforce the thermoplastic resin, and particularly in a case where the diameter of monofilaments is relatively small, it has an effect to increase the flexural modulus of elasticity of a molded product obtainable by molding the thermoplastic resin composition. However, in a case where such a molded product is used for an application where higher mechanical strength is required, a known reinforcing fiber may be incorporated together with the glass fiber of the present invention, to the thermoplastic resin composition of the present invention. In such a case, the reinforcing fiber and the glass fiber of the present invention are the same in the form as fiber, whereby the two may be dispersed similarly without localization, when they are kneaded together with the thermoplastic resin to obtain a thermoplastic resin composition or to mold such a composition into a molded product. As such reinforcing fiber, glass fiber, ceramic fiber, carbon fiber, whisker, aromatic polyamide fiber may, for example, be used. The glass composition of the above-mentioned reinforcing glass fiber may, for example, be A glass, D glass, E glass, ECR glass, S glass or AR glass. Further, the above ceramic fiber may, for example, be alumina fiber, silicon/alumina fiber or silicon nitride fiber. The above whisker may, for example, be aluminum borate whisker.

Such reinforcing fiber may be used in the form of short fiber or long fiber (inclusive of continuous fiber). As the reinforcing fiber, it is particularly preferred to use E glass fiber, since it is inexpensive and commonly used.

Further, the glass fiber of the present invention and the reinforcing fiber may be mixed, i.e. mixed and withdrawn in a monofilament level to form a co-mingled yarn which may be used in the form of continuous fiber or chopped strands, as cut into a prescribed length. Otherwise, the glass fiber of the present invention and the reinforcing fiber may be withdrawn together and used as a continuous bundle of fibers.

The thermoplastic resin composition of the present invention can be produced by the same method as for a conventional glass fiber-reinforced thermoplastic resin composition. For example, there may be mentioned a method wherein chopped strands of the glass fiber of the present invention and the thermoplastic resin, and, if necessary, chopped strands of a reinforcing fiber, are preliminarily compounded by means of an extruder to obtain a thermoplastic resin composition in the form of pellets, a method wherein a roving or strands of the glass fiber of the present invention, or a co-mingled yarn or a bundle of fibers, formed by withdrawing the glass fiber of the present invention and the reinforcing fiber, is impregnated with a molten thermoplastic resin and then cut into a prescribed length to obtain a thermoplastic resin composition in the form of pellets, or a method wherein the glass fiber of the present invention is preliminarily coated thickly with the thermoplastic resin and then cut into a prescribed length to obtain a thermoplastic resin composition in the form of pellets.

Further, the thermoplastic resin compositions of the present invention, obtained by the above methods, may be molded by various methods in the same manner as for conventional thermoplastic resins, to form molded products. Such molding methods include, for example, extrusion molding, injection molding and pultrusion.

Now, the present invention will be described in further detail with reference to Examples. However, it should be understood that the present invention is by no means restricted to such specific Examples.

The methods for evaluation of the glass transition temperature, the color (Yellowness Index: YI value), the water resistance, the flame retardancy, the smoke-suppressing property, the flexural modulus of elasticity and DTUL, used in the Examples, will be shown below.

For the glass transition temperature, a powder obtained by pulverizing glass cullet and sieving it with a sieve (JIS size: 44 $\mu$m), was subjected to the measurement, and using a differential thermal analyzer (DTA), the measurement was carried out at a heating rate of 10° C./min in a nitrogen atmosphere. The temperature of the shoulder at the first endothermic portion in the DTA curve was taken as the glass transition temperature. For the color (YI value), a glass cullet was mirror-polished to have a size of 15×15 mm and a thickness of 6 mm, and using a color difference meter (Σ90, manufactured by NIPPON DENSHOKU INDUSTRIES CO., LTD.), the measurement was made with a measuring beam diameter of 10 mm, while supporting the rear side of the glass cullet by a standard white plate, to obtain the YI value. For the water resistance, a glass cullet having a size of 15 mm×15 mm and a thickness of 6 mm was weighed as a test sample, and then immersed in a boiled water bath. Upon expiration of 6 hours, it was taken out from the bath and dried at room temperature and then, the loss in mass of the sample after the immersion was measured. The proportion of the loss in mass based on the mass before the immersion, was represented by percentage. For the flame retardancy, a vertical flame test was carried out in accordance with UL94 standards using a test specimen of 12.7 mm in width, 127 mm in length and 1.6 mm in thickness, and the flame retardancy was evaluated by the four ranks in accordance with the evaluation standards of said standard, i.e. V-0: no dripping which sets fire to cotton, is observed by single combustion of the test specimen for a combustion time of at most 10 seconds, V-1: no dripping which sets fire to cotton, is observed by single combustion of the test specimen for a combustion time of at most 30 seconds, V-2: a dripping which sets fire to cotton, is observed by single combustion of the test specimen for a combustion time of at most 30 seconds, and V-OUT: the result does not satisfy the requirement for V-2. For the smoke-suppressing property, a test was carried out using a test specimen of 76 mm in width, 76 mm in length and 3.2 mm in thickness by means of a NBS smoke chamber test apparatus in accordance with a test method of ASTM E662, and evaluation was made by ⊚: the maximum smoke density (Dmax) being less than 200, ○: the maximum smoke density is at least 200 and less than 250, Δ: the maximum smoke density is at least 250 and less than 300, and X: the maximum smoke density being at least 300. The flexural modulus test was carried out in accordance with ASTM D 790, and a test specimen of 3.2 mm in thickness, 12.7 mm in width and 127 mm in length, was subjected to the measurement. The test for the deflection temperature under load (hereinafter referred to as DTUL), was carried out in accordance with ASTM D 648, and a test specimen of 3.2 mm in thickness, 12.7 mm in width and 127 mm in length, was subjected to the measurement.

EXAMPLES 1 TO 4 AND COMPARATIVE EXAMPLES 1 TO 3

Glass materials were mixed, melted and solidified to obtain glass cullets, so that the glass compositions would be those of Examples 1 to 4 and Comparative Examples 1 to 3 shown in Table 1. Using, as a fiber-forming apparatus, a platinum/rhodium alloy bushing having 100 tips, such glass cullets were re-melted and subjected to tests for forming glass fibers, whereby the efficiency or difficulty in fiber forming was evaluated. With glass compositions of Examples 1 and 2, fiber forming was possible, and although some thread breakage was observed, continuous production could be carried out without any particular trouble. With the glass composition of Comparative Example 1, breakage of monofilaments frequented, and it was not possible to carry out fiber forming continuously.

TABLE 1

| Composition (mol %) | Ex. 1 | Ex. 2 | Ex. 3 | Ex. 4 | Comp. Ex. 1 | Comp. Ex. 2 | Comp. Ex. 3 |
|---|---|---|---|---|---|---|---|
| $Li_2O$ | 4.7 | 4.1 | 4.1 | 4.0 | 4.3 | 6.0 | 4.0 |
| $Na_2O$ | 20.4 | 5.7 | 5.7 | 5.7 | 5.4 | 6.8 | 5.6 |
| $K_2O$ | 5.7 | 4.4 | 4.3 | 4.3 | 5.6 | 6.8 | 4.3 |
| ZnO | 30.2 | 40.5 | 40.2 | 39.9 | 40.5 | 44.0 | 39.7 |
| $B_2O_3$ | 9.5 | 9.6 | 9.6 | 9.5 | — | — | 9.5 |
| $P_2O_5$ | 21.4 | 24.9 | 24.8 | 24.6 | 30.0 | 32.5 | 24.4 |
| $Al_2O_3$ | 1.4 | 1.5 | 1.5 | 1.5 | 1.7 | 2.2 | 1.5 |
| $SO_3$ | 6.7 | 9.3 | 9.2 | 9.2 | 12.5 | — | 9.1 |
| $MoO_3$ | — | — | 0.6 | 1.2 | — | 2.0 | 1.9 |

TABLE 1-continued

| Composition (mol %) | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Evaluation |  |  |  |  |  |  |  |
| Fiber forming efficiency | ○ | ○ | ⊚ | ⊚ | X | ⊚ | ⊚ |
| Tg (° C.) | 359 | 354 | 380 | 381 | 282 | 334 | 381 |
| Color (YI value) | — | 7.2 | 12.5 | 15.9 | — | — | 23.3 |
| Water resistance (%) | — | 0.02 | — | — | — | 0.52 | — |

⊚: Excellent
○: Good
X: Bad

Further, when Example 2 and Comparative Example 2 are compared, it is evident that Comparative Example 2 having a large amount of $P_2O_5$ is poor in water resistance, although fiber forming can be carried out. With the glass compositions of Examples 3 and 4 and Comparative Example 3, thread breakage was less frequent than with the glass compositions of Examples 1 and 2, whereby fiber forming could be carried out constantly. The results of measurement of the glass transition temperatures (Tg) of the glasses of Examples 1 to 4 and Comparative Examples 1 to 3, are also shown in Table 1.

With the glass composition of Comparative Example 3, the yellowish color of the glass is strong, whereby there may be a problem that when the glass fiber obtained from this composition, and the thermoplastic resin, are kneaded to obtain a thermoplastic resin composition, and such a composition is molded to obtain a molded product, the color of the molded product tends to be yellowish. The results of measurements of the glass transition temperatures and the colors of such Examples 3 and 4 and Comparative Example 3, are also shown in Table 1.

Preparation of Glass Fiber Sample

By means of the above fiber forming apparatus, the glass cullet having the glass composition of Example 1 was formed into fiber, which was, after applying a sizing agent, wound up to obtain glass fiber having 100 monofilaments having an average diameter of 10 μm bundled. This glass fiber was cut in 3 mm to obtain chopped strands 1 (hereinafter referred to as CS1). As the sizing agent at the time, an aqueous solution comprising 1 part by mass (as a solid content) of γ-aminopropyl triethoxysilane, 5 parts by mass (as a solid content) of a urethane resin emulsion and 94 parts by mass of water, was employed. The amount of the sizing agent applied was 0.6 mass %, as a solid content, based on the mass of the glass fiber after the application.

Further, chopped strands 2 (hereinafter referred to as CS2) were obtained in the same manner as in the process for preparing CS1 except that as the sizing agent, an aqueous solution comprising 2 parts by mass (as a solid content) of γ-aminopropyl triethoxysilane and 98 parts by mass of water, was employed, and the amount of the sizing agent applied, was 0.2 mass % as a solid content.

Further, chopped strands 3 (hereinafter referred to as CS3) were obtained in the same manner as in the process for preparing CS1, except that no sizing agent was applied.

Further, chopped strands 4 (hereinafter referred to as CS4) were obtained in the same manner as in the process for preparing CS1 except that the glass cullet having the glass composition of Example 3 was used.

Further, the above cullet having the glass composition of Example 1 was pulverized for 15 minutes by a ball mill and then sieved to obtain powdery glass (hereinafter referred to as PW1) having an average particle size of 100 μm.

EXAMPLE 5

90 parts by mass of a bisphenol A type polycarbonate resin (viscosity average molecular weight: about 22,000), 0.1 part by mass of a phosphorus type stabilizer, 0.1 part by weight of a phenol type stabilizer, 0.2 part by mass of a fluoropolymer as an antidripping agent, and 10 parts by mass of CS1 as glass fiber, were preliminarily mixed and then compounded by means of a twin screw extruder having a cylinder temperature set at 280° C. and a screw outer diameter of 35 mm, to obtain a thermoplastic resin composition in the form of pellets. This thermoplastic resin composition was dried at 120° C. for 5 hours and then molded by means of an injection molding machine at a cylinder temperature of 280° C. and at a mold temperature of 120° C. to obtain a test specimen of the thermoplastic resin composition of Example 5.

EXAMPLE 6

A test specimen of a thermoplastic resin composition of Example 6 was obtained in the same manner as in Example 5 except that 10 parts by mass of CS3 was used as glass fiber.

EXAMPLE 7

A test specimen of a thermoplastic resin composition of Example 7 was obtained in the same manner as in Example 5 except that 10 parts by mass of CS4 was used as glass fiber.

COMPARATIVE EXAMPLE 4

A test specimen of a thermoplastic resin composition of Comparative Example 4 was obtained in the same manner as in Example 5 except that 10 parts by mass of PW1 was used as glass powder.

COMPARATIVE EXAMPLE 5

A test specimen of a thermoplastic resin composition of Comparative Example 5 was obtained in the same manner as in Example 5 except that no glass fiber or glass powder was incorporated.

Using the test specimens of Examples 5 to 7 and Comparative Examples 4 and 5, evaluation of the flame retardancy, the flexural modulus of elasticity and DTUL was carried out. The results are shown in Table 2.

TABLE 2

|  | Ex. 5 | Ex. 6 | Ex. 7 | Comp. Ex. 4 | Comp. Ex. 5 |
| --- | --- | --- | --- | --- | --- |
| Glass employed | CS1 | Cs3 | CS4 | PW1 | — |
| Evaluation results: |  |  |  |  |  |
| Flame retardancy | V-0 | V-1 | V-0 | V-OUT | C-2 |
| Flexural modulus of elasticity (MPa) | 4200 | 3500 | 4100 | 2700 | 2300 |
| DTUL (° C.) | 136 | 134 | 135 | 131 | 129 |

From the results in Table 2, it is evident that as compared with the Comparative Example wherein the glass is in a powder form, in Examples of the present invention wherein the glass is in a fiber form, the flame retardancy is improved, and dispersion of the glass in the thermoplastic resin is good. This indicates that development of the flame retardancy of the glass composition, is different depending upon the dispersibility due to the form of the glass. Further, it is evident that the physical properties such as the flexural modulus of elasticity and DTUL were improved with the glass in a fiber form over the glass in a powder form. It is further evident that by an application of a sizing agent to the glass fiber, the flame retardancy, the flexural modulus of elasticity and DTUL were further improved.

EXAMPLE 8

100 parts by mass of a polyvinyl chloride resin (polymerization degree: 800), 3 parts by mass of a tin-type stabilizer, 1 part by mass of calcium stearate, and 30 parts by mass of CS2 as glass fiber, were introduced into a double kneading roll apparatus set at a temperature of 180° C. at a roll rotational speed of 20 rpm and melt-kneaded to obtain a thermoplastic resin composition. This thermoplastic resin composition was dried at 80° C. for 5 hours and then molded by means of a press molding machine at a mold temperature of 180° C. under a molding pressure of 10 MPa for a molding time of 5 minutes to obtain a molded product of the thermoplastic resin composition of Example 8.

EXAMPLE 9

A molded product of a thermoplastic resin composition of Example 9 was obtained in the same manner as in Example 8 except that 30 parts by mass of CS3 was used as glass fiber.

COMPARATIVE EXAMPLE 6

A molded product of a thermoplastic resin composition of Comparative Example 6 was obtained in the same manner as in Example 8 except that 30 parts by mass of PW1 was used as glass powder.

COMPARATIVE EXAMPLE 7

A molded product of a thermoplastic resin composition of Comparative Example 7 was obtained in the same manner as in Example 8 except that no glass fiber or glass powder was incorporated.

From the molded products of Examples 8 and 9, and Comparative Examples 6 and 7, test specimens to be used for evaluation of the smoke suppressing property and the flexural modulus of elasticity, were obtained, and such evaluation was carried out. The results are shown in Table 3.

TABLE 3

|  | Ex. 8 | Ex. 9 | Comp. Ex. 6 | Comp. Ex. 7 |
| --- | --- | --- | --- | --- |
| Glass employed | CS2 | CS3 | PW1 | — |
| Evaluation results: | | | | |
| Smoke suppressing property | ⊚ | ⊚ | ○ | X |
| Flexural modulus of elasticity (MPa) | 4170 | 3750 | 3530 | 2720 |

From the results in Table 3, it is evident that as compared with the Comparative Example wherein the glass is in a powder form, in Examples wherein the glass is in a fiber form, the effect to suppress smoking is improved, and the dispersion of the glass in the thermoplastic resin is good. This indicates that development of the smoke-suppressing property of the glass composition is different depending upon the dispersibility due to the form of the glass. Further, it is evident that the flexural modulus of elasticity is improved with the glass in the form of fiber over the glass in the form of powder. Further, it is evident that by an application of a sizing agent to the glass fiber, the flexural modulus of elasticity can further be improved.

According to the present invention, it is possible to obtain glass fiber which can be mass-produced constantly and which has the dispersibility in the thermoplastic resin improved and has higher flame retardancy or the effect to suppress smoking during the combustion. Further, by combining the glass fiber of the present invention with a thermoplastic resin, it is possible to improve the flame retardancy of the thermoplastic resin composition or a molded product obtained by molding the composition, and the effects to suppress smoking at the time of combustion and at the same time to improve the physical properties.

The entire disclosure of Japanese Patent Application No. 2002-035440 filed on Feb. 13, 2002 including specification, claims, and summary is incorporated herein by reference in its entirety.

What is claimed is:

1. Glass fiber which comprises the following composition as represented by mol percentage and has a glass transition temperature higher than 300° C. and lower than 400° C.:

$Li_2O+Na_2O+K_2O$: 5 to 35%, $P_2O_5$: 20 to 27%, $SO_3$: 3 to 20%, ZnO: 10 to 55%, MgO: 0 to 20%, ZnO+MgO: 10 to 55%, $Al_2O_3$: 1 to 5%, and $B_2O_3$: 8 to 20%.

2. The glass fiber according to claim 1, which further contains $MoO_3$ in an amount of from 0.05 to 1.5%, as represented by mol percentage.

3. A thermoplastic resin composition comprising 100 parts by mass of a thermoplastic resin and from 1 to 400 parts by mass of glass fiber which comprises the following composition as represented by mol percentage and has a glass transition temperature higher than 300° C. and lower than 400° C.:

$Li_2O+Na_2O+K_2O$: 5 to 35%, $P_2O_5$: 20 to 27%, $SO_3$: 3 to 20%, ZnO: 10 to 55%, MgO: 0 to 20%, ZnO+MgO: 10 to 55%, $Al_2O_3$: 1 to 5%, and $B_2O_3$: 8 to 20%.

4. The thermoplastic resin composition according to claim 3, wherein the glass fiber further contains $MoO_3$ in an amount of from 0.05 to 1.5%, as represented by mol percentage.

5. The thermoplastic resin composition according to claim 3, wherein the thermoplastic resin is polyvinyl chloride.

6. The thermoplastic resin composition according to claim 3, wherein the thermoplastic resin is a polycarbonate resin.

7. The glass fiber according to claim 1, wherein the glass transition temperature is higher than 340° C. and lower than 400° C.

8. The glass according to claim 1, which is in the form of a chopped strand having a length of from 1 to 20 mm.

9. The glass fiber according to claim 1, which is in the form of a plurality of monofilaments having an average diameter of from 1 to 30 μm.

10. The glass fiber according to claim 9, which is in the form of a plurality of monofilaments having an average diameter of from 6 to 23 μm.

11. The glass fiber according to claim 1, in combination with a sizing agent.

12. The thermoplastic resin composition according to claim 3, additionally containing reinforcing fibers other than said glass fibers.

13. The thermoplastic resin composition according to claim 12, wherein the reinforcing fibers are E glass fibers.

14. A molded product obtained by molding the thermoplastic resin composition according to claim 3.

15. A molded product obtained by molding the thermoplastic resin composition according to claim 4.

16. A molded product obtained by molding the thermoplastic resin composition according to claim 5.

17. A molded product obtained by molding the thermoplastic resin composition according to claim 6.

* * * * *